United States Patent [19]

Yoshida et al.

[11] Patent Number: 5,828,464

[45] Date of Patent: Oct. 27, 1998

[54] ELECTROMECHANICAL ROTOGRAVURE STYLUS AUTOMATIC CALIBRATOR

[75] Inventors: Takumi Yoshida; Tadashi Syudou; Minetoshi Yamaguchi, all of Kyoto, Japan

[73] Assignee: Dainippon Screen Mfg. Co. Ltd., Kyoto, Japan

[21] Appl. No.: 143,552

[22] Filed: Oct. 26, 1993

[30] Foreign Application Priority Data

Oct. 28, 1992 [JP] Japan .................................. 4-290094

[51] Int. Cl.$^6$ ........................................................ B41C 1/02
[52] U.S. Cl. ........................................................ 358/299
[58] Field of Search ................................. 358/299, 296, 358/298, 406, 504, 534, 536; 409/204, 207; 364/474.02, 474.12, 474.35, 474.37; 382/141

[56] References Cited

U.S. PATENT DOCUMENTS

| | | | |
|---|---|---|---|
| 4,422,101 | 12/1983 | Takei ........................................... | 358/299 |
| 4,612,584 | 9/1986 | George et al. .............................. | 358/299 |
| 4,944,593 | 7/1990 | Kalstroem et al. ......................... | 356/379 |
| 5,029,011 | 7/1991 | Fraser ......................................... | 358/299 |
| 5,293,426 | 3/1994 | Wouch et al. ......................... | 358/299 X |
| 5,422,958 | 6/1995 | Wouch et al. .............................. | 382/141 |
| 5,424,845 | 6/1995 | Holowko et al. ........................... | 358/299 |
| 5,438,422 | 8/1995 | Holowko et al. ........................... | 358/299 |
| 5,440,398 | 8/1995 | Holowko et al. ........................... | 358/299 |

FOREIGN PATENT DOCUMENTS 164764  12/1985  European Pat. Off. ......... H04N 1/40

*Primary Examiner*—Peter S. Wong
*Assistant Examiner*—Gregory J. Toatley, Jr.
*Attorney, Agent, or Firm*—Ostrolenk, Faber, Gerb & Soffen, LLP

[57] ABSTRACT

In an electromechanical engraving system, rotogravure calibrating apparatus automatically adjusting the engraving operation of an engraving-head stylus of the system in real time by calibrating a stylus-actuating engraving signal according to a calibration factor relating printed image density to engraved cell depth for a designated engraving screen ruling corresponding to printed image resolution. The calibrating apparatus includes a cell observation and measuring device which obtains data for calculating cell size by imaging the form of individual test cells engraved by the stylus into the surface of a rotogravure printing cylinder, and an engraving signal calibrator which adjusts engraving signal control parameters according to the cell size calculation and to the calibration factor. The engraving signal calibrator derives an image-density/cell-depth reference characteristic computed according to cell size data from cells engraved to correspond to a representative series of test image densities at the designated screen ruling, and computes the calibration factor as a correction of the image-density/cell-depth reference characteristic, generating engraving signal gain data which accordingly adjust the engraving signal actuating the stylus. The engraving signal is rapidly and automatically adjusted through a simplified calibration of the stylus-actuating engraving signal, stabilizing stylus lateral displacement adjustments for consistency among printing operations.

27 Claims, 13 Drawing Sheets

Higher Density ↓

ELECTROMECHANICAL ROTOGRAVURE STYLUS AUTOMATIC CALIBRATOR

BACKGROUND OF THE INVENTION

1. Technical Field

The present invention relates to electromechanical rotogravure stylus control; more specifically, it relates to an apparatus for calibrating drive of an engraving-head stylus of a rotogravure engraving system during start of an engraving operation so as to adjust the depth of cells electromechanically cut by the stylus into a printing cylinder, in order to realize full-range printing image density consistently in correspondence with selected printing resolution.

2. Description of the Background

A rotogravure electromechanical engraving machine forms fine pyramidal pits known as cells into the surface of a copper-plated gravure printing cylinder as it is rotated. The dimensions of each cell (each of which corresponds to the image density of one scanned dot from the original) control the amount of ink the cells will contain, which thus determines the density of the printed image. An engraving head carrying a diamond-tipped stylus serves as the cutting tool for cutting the cells into the printing cylinder surface. The engraving operation is carried out by the stylus vibrating in response to a cutting-depth modulated actuating signal at a frequency of several kHz.

FIG. 14 diagrams the waveform components of such an engrave-actuating signal applied to the engraving head, and corresponds to the displacement waveform of the stylus itself. The signal is generated by superimposing a high-frequency carrier signal as illustrated in FIG. 14(a) with an image density signal, an example waveform of which is illustrated in FIG. 14(b). The modulated signal is thus applied to the engraving head as an engraving signal driving the stylus to cut cells into the rotating cylinder surface of size corresponding to designated image density at the carrier signal frequency. In the presently illustrated example, the single-dashed broken line S in the FIG. 14(c) waveform diagram corresponds to the cylinder surface and the hatched-in portion in the diagram corresponds to a cell.

Accordingly, in the rotogravure electromechanical engraving process, cell depth represents printed image density such that there is a one-to-one correspondence between cell size and density at a given resolution for the printed image. The configurational arrangement of the cut cells patterns the cells along lines diagonal with respect to the printing cylinder axis, and the number per inch of these lines (i.e., the screen ruling) corresponds to image resolution. Moreover, irrespective of the screen ruling uncut copper must be left between adjacent cells in a line, to support the gravure printing doctor blade. Thus, as cell form is varied to change screen angles for original color separations, along with screen ruling for change in image resolution, the corresponding relation between density and cell form must be changed accordingly. It is therefore necessary that uniform adjustment of the stylus displacement drive be made every time screen ruling and cell form are changed for a given engraving operation. Furthermore, the stylus displacement has to be adjusted by altering the engraving signal accordingly each time the engraving head is changed, since, due to mechanical variation, an identical engraving signal applied to the new engraving head to drive the stylus will not produce the same stylus displacement as previously. Still further, since cell depth varies with hardness of the copper-plated surface, the displacement also has to be adjusted when the printing cylinder is replaced.

Conventionally, the stylus displacement adjustment is made by engraving trial cells every time any of the operating conditions is changed. Specifically, one end of the gravure printing cylinder is trial-engraved by applying an appropriate engraving signal to the engraving head, and the test cells are observed with an apparatus including an optical microscope, a solid-state (CCD) camera, a monitor and other elements, for discriminating individual cell size using cell width measurement as a basis for comparison with specification. Thus, trial engraving operations are repeated, applying engraving signals to the engraving head which are varied until cells of width in conformity with specific printing requirements are produced.

The afore-described stylus displacement adjusting procedure requires a great deal of operator labor and considerable processing time, reducing overall productivity. Moreover, because the cell dimensions are operator-measured, and the engraving signal is adjusted by manual setting of stylus displacement engraving signal gain parameters, results will vary with the operator. This means that there will be inconsistencies in the cell depths among printing operations at a given image density.

SUMMARY OF THE INVENTION

It is an object of the present invention to automate and simplify calibration of the displacement of an electromechanical rotogravure stylus, stabilizing adjustments for consistency among printing operations.

Rotogravure automatic calibrating apparatus in an electromechanical engraving system according to the present invention automatically adjusts the engraving operation of an engraving-head stylus of the system in real time by calibrating a stylus-actuating engraving signal according to a printed image density/cell depth calibration factor for a designated engraving screen ruling corresponding to printed image resolution. The apparatus comprises cell measuring means including cell observation means, and engraving signal calibrating means.

The cell observation means obtains cell image data by imaging, through image processing apparatus, the form of individual test cells engraved by the stylus into the printing cylinder surface. The image processing apparatus incorporates the cell measuring means, which calculates individual cell size from the cell image data obtained by the cell observation means. The engraving signal calibrating means adjusts engraving signal control parameters according to the cell size calculation by the cell measuring means and to the image-density/cell-depth calibration factor for the designated screen ruling, thereby calibrating the engraving signal to actuate the stylus to engrave cells in conformity with printing operation requirements.

Accordingly, electromechanical engraving system rotogravure automatic calibrating apparatus of the present invention adjust a stylus-actuating engraving signal, according to a given image-density/cell-depth calibration factor, to control lateral displacement of the engraving-head stylus by cutting test cells at one end of the printing cylinder. The form of individual test cells is imaged by the cell observation means, providing cell image data. The cell image data is input to the cell measuring means, through which individual cell size is calculated.

The engraving signal calibrating means comprises means for computing an image-density/cell-depth reference characteristic corrected to obtain the calibration factor. The reference characteristic is computed for the designated screen ruling according to cell size data obtained by the cell measuring means from cells engraved to correspond to a representative series of test image densities at a given screen ruling. The engraving signal calibrating means further comprises engraving signal gain data-processing means which computes the calibration factor as a correction of the image-density/cell-depth reference characteristic, and generates engraving signal data which adjust the engraving signal in order to actuate the stylus to engrave cells of size corresponding to the designated screen ruling (image resolution).

With the above-described apparatus the engraving signal is rapidly and automatically adjusted through a simplified calibration of the stylus-actuating engraving signal, stabilizing stylus lateral displacement adjustments for consistency among printing operations.

The foregoing and other objects and advantages will be more fully evident from the following detailed description, which, together with the drawings, is illustrative of a preferred embodiment of the present invention, without intending to be restrictive of such modifications as might become apparent to persons skilled in this art.

DESCRIPTION OF PREFERRED EMBODIMENT

Figure 1:
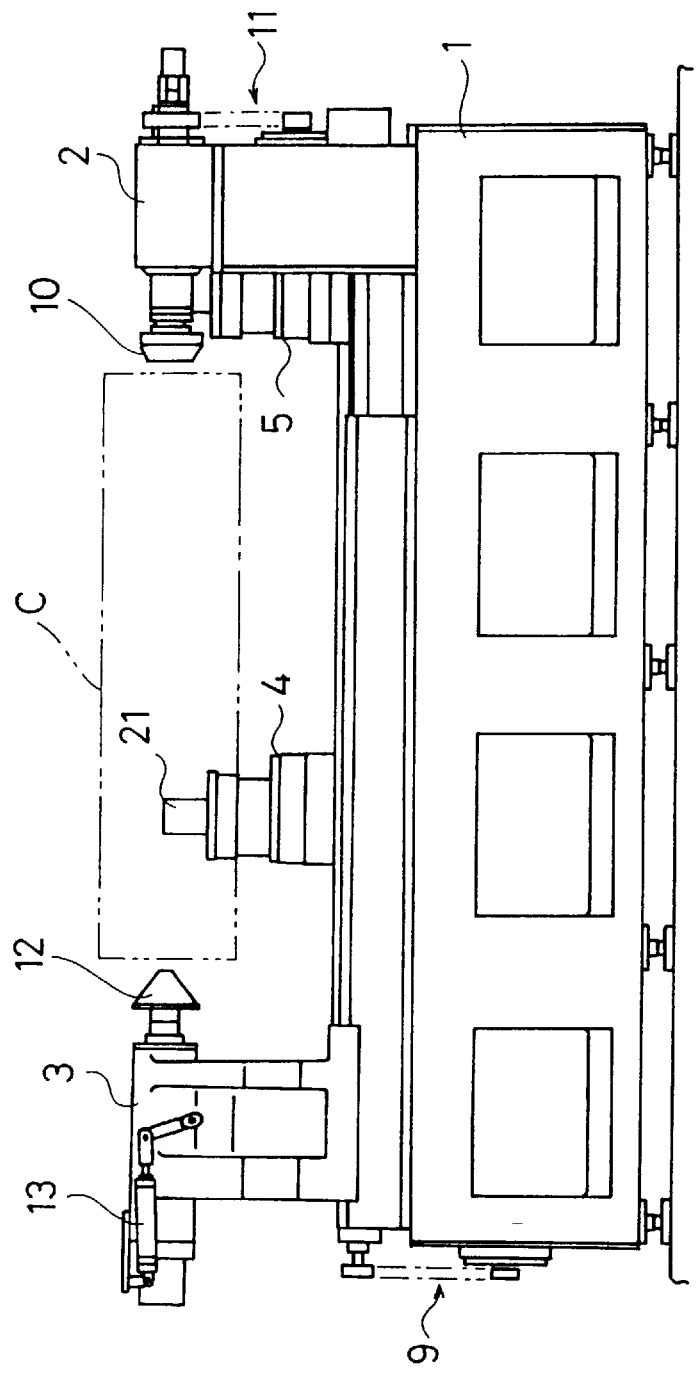
FIG. 1 is a front elevation schematically illustrating a rotogravure electromechanical engraving machine according to an embodiment of the present invention.
Figure 2:
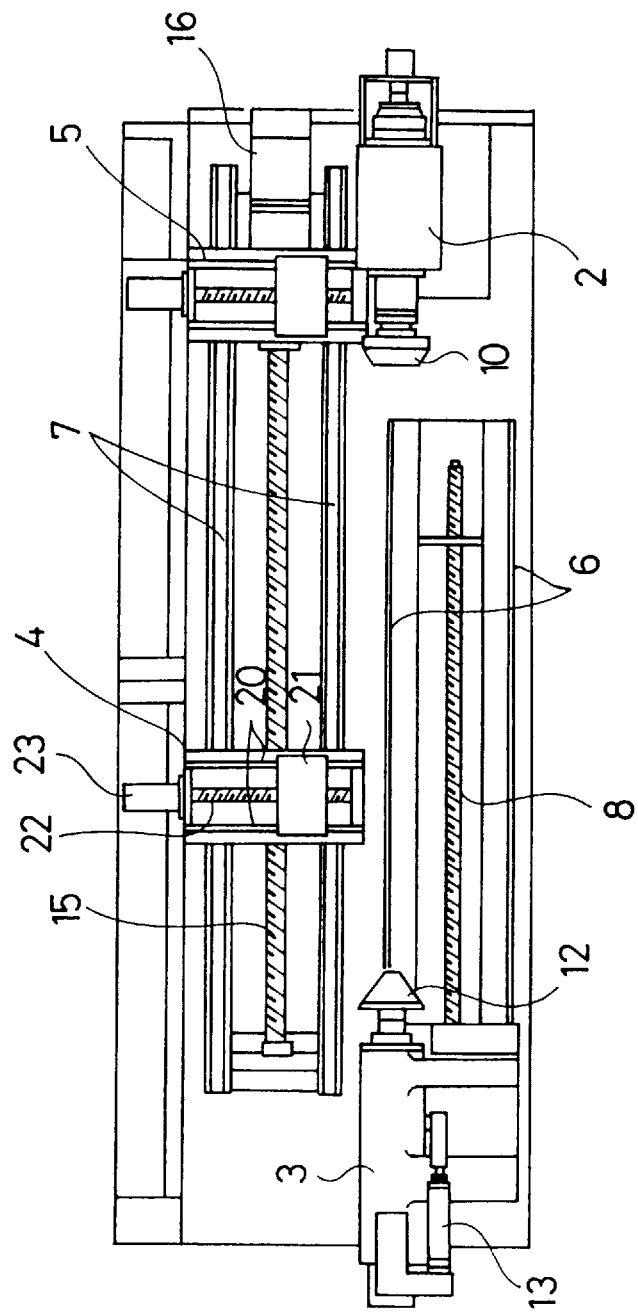
FIG. 2 is a plan view corresponding to FIG. 1.

FIGS. 1 and 2 schematically illustrate principal components of a rotogravure engraving machine according to an embodiment of the present invention.

The engraving machine comprises a bed 1, on top of which at one end a headstock 2 is fixed, a tailstock 3 disposed opposite the headstock 2, and first and second tables 4 and 5. The tailstock 3 is movable in the horizontal direction of the machine along a pair of guide rails 6 disposed on the upper surface of the bed 1. The tailstock 3 can be approached toward and withdrawn away from the headstock 2 by a driving mechanism 9 consisting of a motor, a belt and other elements. A quill 12 is slidable within the tailstock 3 through a cylinder 13. The first and second tables 4 and 5 are horizontally shiftable along the pair of guide rails 7 disposed on the upper surface of the bed 1. Each of the tables 4 and 5 is moved along the rails 7 by a ball screw 15 disposed between the pair of rails 7 and driven by a drive motor 16. A main spindle 10 of the headstock 2 is rotated by a drive mechanism 11 including a drive motor, a belt and other elements. In the above structure, a rotogravure printing cylinder C is supported between the main spindle 10 and the quill 12 as shown by the double-dash broken line in FIG. 1.

Provided on both the first table 4, and the second table 5, is an engraving head 21 translatable transverse to the direction in which the tables slide. Guide rails 20 are provided on the upper surface of both the tables 4 and 5, and each engraving head 21 is translated by a drive mechanism consisting of a ball screw 22 and a drive motor 23.

Figure 3:
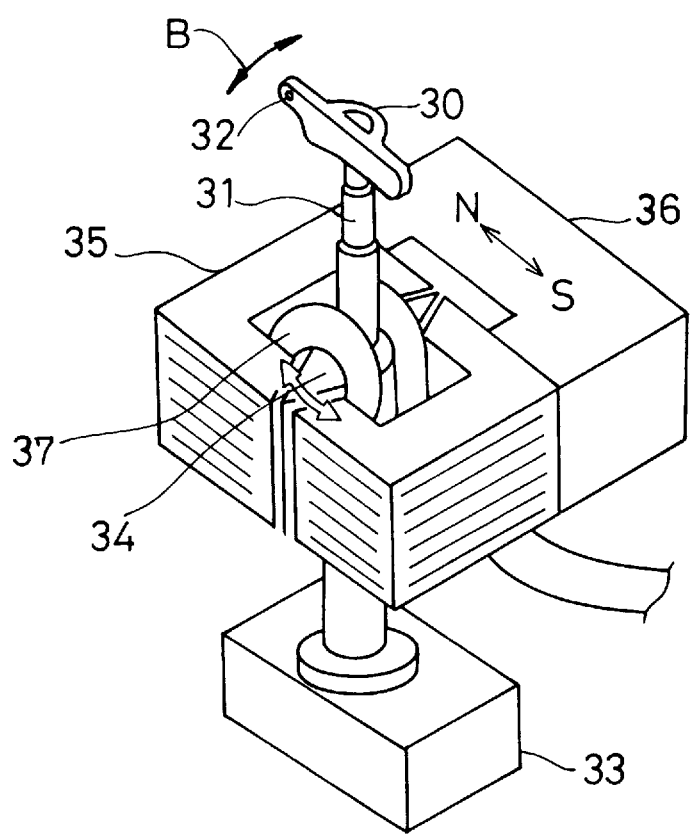
FIG. 3 is a perspective view illustrating a rotogravure stylus-carrying engraving head mounted in its actuating mechanism.

FIG. 3 illustrates a stylus 30 provided on the engraving head 21, and its associated drive mechanism.

The stylus 30 is fixed to an end of a perpendicular torsion shaft 31, and a diamond cutting tool 32 is mounted on one end of the stylus 30. The other end of the torsion shaft 31 is fixed to a mounting base 33. A rhombic rotor 34 is fixed to the mid portion of the torsion shaft 31. A stack of magnetic laminations (stator) 35 surrounds the rotor 34. Magnetic flux through the stator 35 is provided by a laterally mounted permanent magnet 36. Furthermore, encircling the rotor 34 between it and the stator 35 is a coil 37. In this structure, when an engraving signal is applied to the coil 37, the stylus 30 is vibrated in the direction indicated by arrow B in the figure according to the engraving signal carrier frequency.

Figure 4:
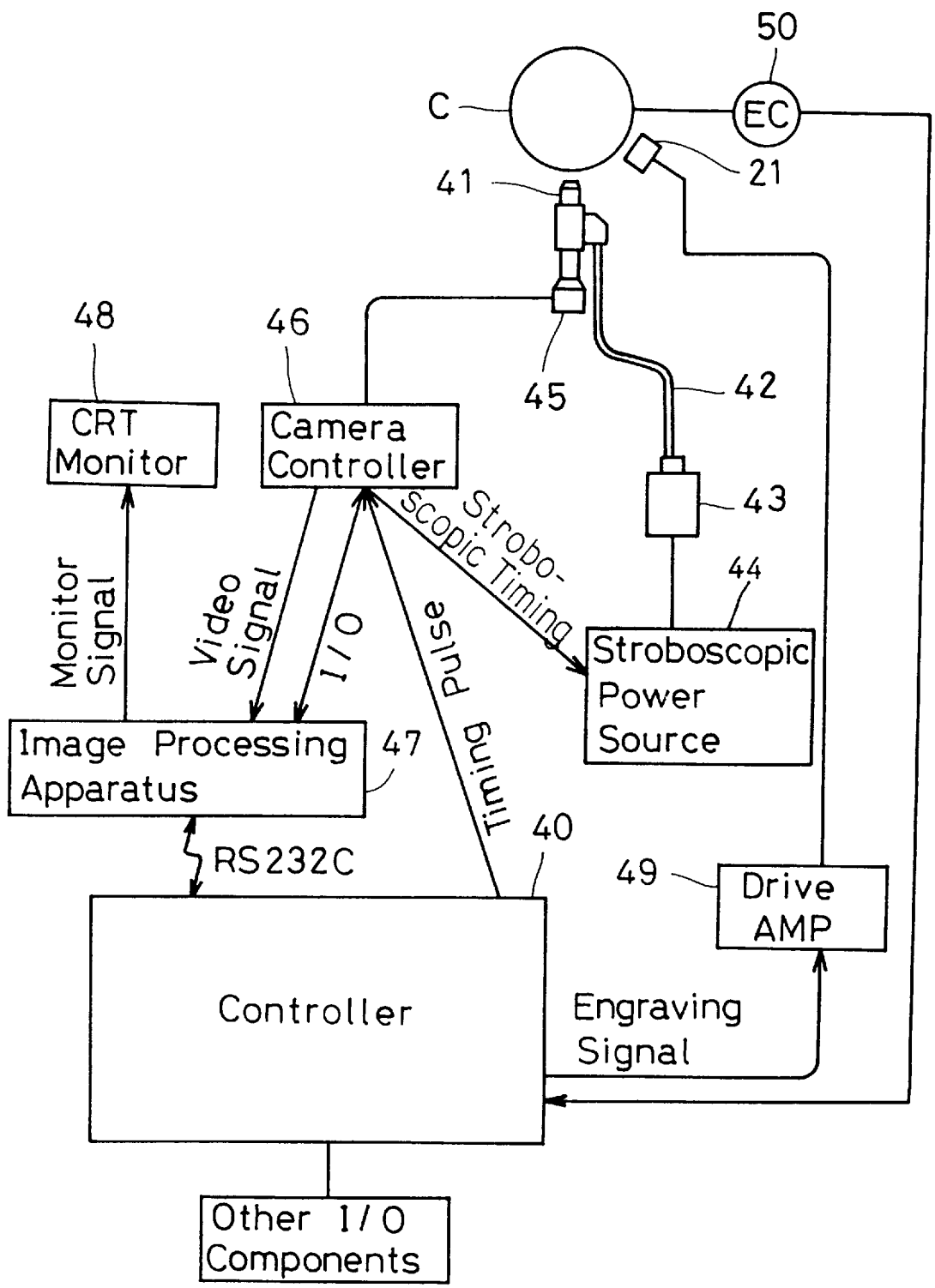
FIG. 4 is a block diagram schematically illustrating a rotogravure engraving system according to the present invention.
Figure 5:
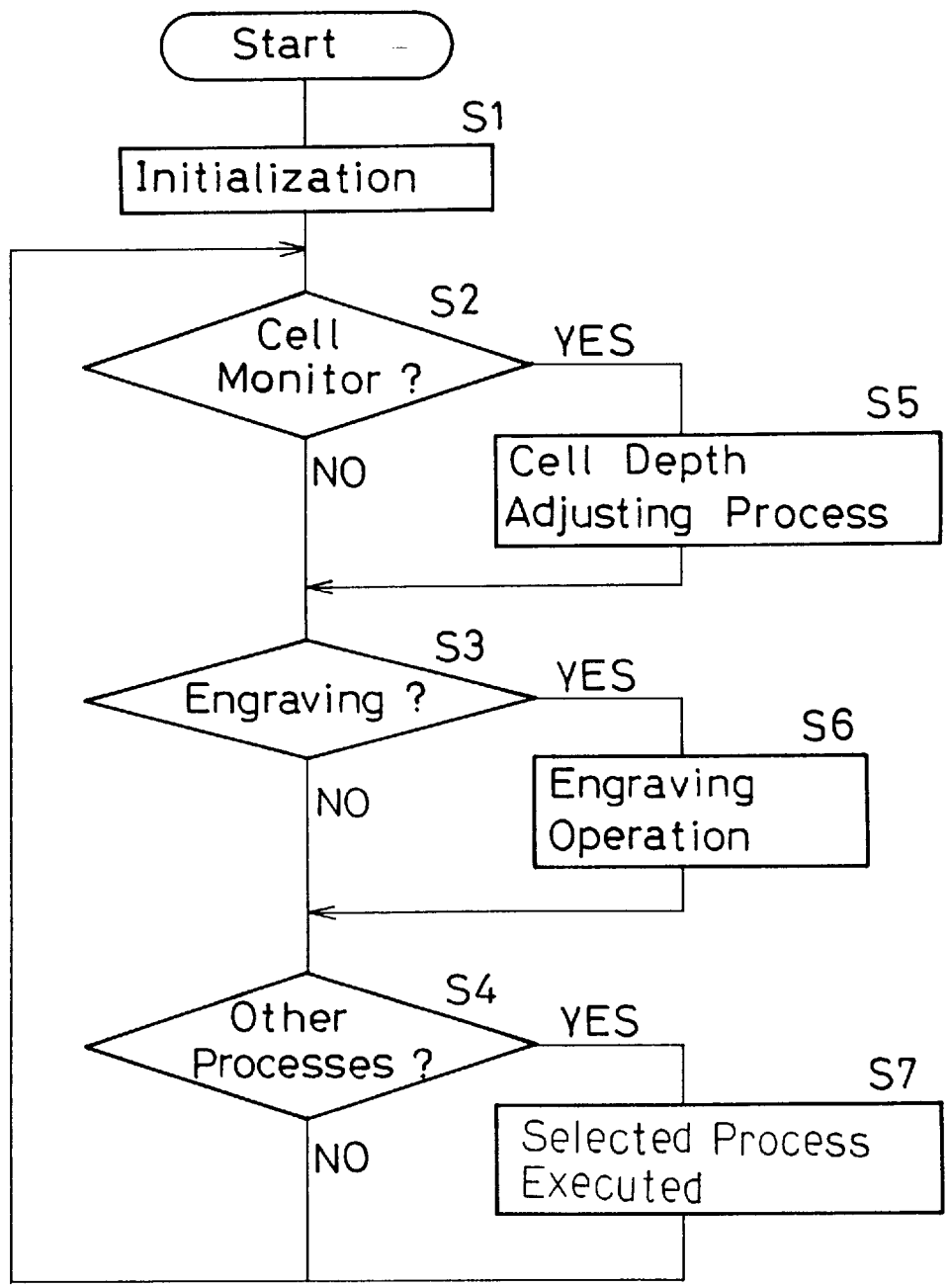
FIG. 5 is a flowchart illustrating a control process of the engraving system.
Figure 6:
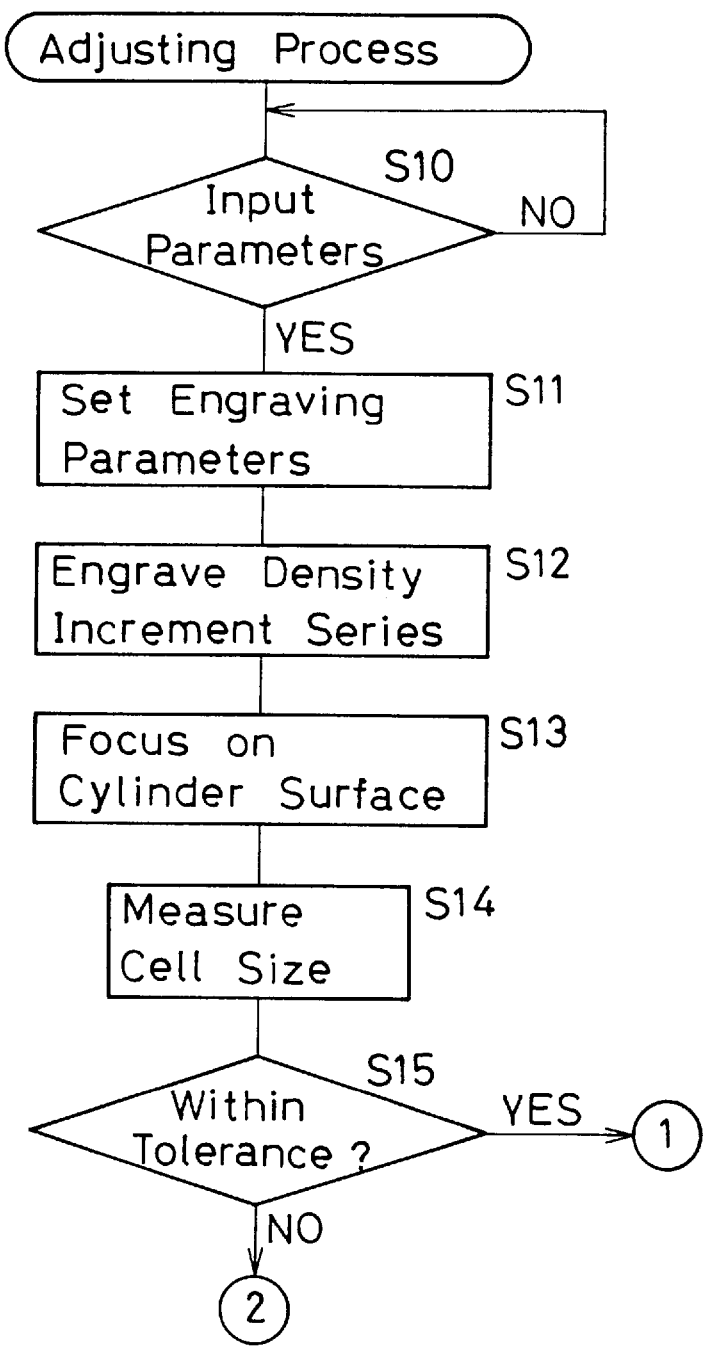
FIGS. 6–9 are flowcharts illustrating stylus displacement adjustment control process.

FIG. 4 illustrates a control block diagram of a rotogravure engraving system control apparatus according to the present invention.

The control apparatus comprises a controller 40 consisting of a microcomputer containing a CPU, a RAM, a ROM, etc. An optical microscope 41 for observing the form of engraved cells is disposed between the headstock 2 and the tail stock 3 opposite the surface of the gravure cylinder C toward one end. The optical microscope 41 can be approached toward and withdrawn away from the gravure cylinder C. A stroboscopic light source 43 is connected to the optical microscope 41 through a fiber cable 42, and a stroboscopic power source 44 is connected to the stroboscopic light source 43. By driving the stroboscopic light source 43 at a predetermined strobe frequency, a portion of the cylinder surface can be observed as a still image during rotation of the gravure cylinder C. A charge-coupled device 45 is provided in the optical microscope 41. Image data obtained by the CCD 45 is input to a camera controller 46. The camera controller 46 is connected to an image processing apparatus 47.

A CRT monitor 48 is connected to the image processing apparatus 47. A video signal is input from the camera controller 46 to the image processing apparatus 47, which in turn applies a monitor signal to the CRT monitor 48. The image processing apparatus 47 computes cell form from the video signal received from the camera controller 46. The image processing apparatus 47 and the controller 40 are connected through an RS232C connection.

The controller 40 functions to carry out stylus-actuating engraving signal adjustment on the basis of data from the image processing apparatus 47. The engraving signal from the controller 40 is applied to the engraving head 21 through a drive amplifier 49. The engraving signal from the drive amplifier 49 is applied to the coil 37 of the engraving-head 21. Rotation position of the gravure cylinder C is detected by an encoder 50, which outputs a signal input to the controller 40. In addition, the controller 40 generates a timing pulse output to the camera controller 46, which in turn applies a stroboscopic timing signal to the stroboscopic power source 44 inducing the strobe. Miscellaneous I/O components are further connected to the controller 40.

Control operation of a electromechanical rotogravure engraving system according to the present invention will be described reference to the flowcharts of FIGS. 5 to 9.

When a start switch of the machine is turned on, initialization is carried out at step S1 of the control program, during which, for example, operations restoring each of the engraving machine components to its initial position are carried out. Then, it is determined at step S2 whether a cell monitor mode is selected or not. In the cell monitor mode, the machine performs trial engraving operations on the gravure cylinder and accordingly adjusts stylus lateral displacement, i.e., cell depth. Next, at step S3 it is determined whether a command for starting the engraving operation is given, and it is determined at step S4 whether other processes are selected.

When the cell monitor mode is selected, the program proceeds from step S2 to step S5, wherein a process, to be described below, for adjusting the lateral displacement of the stylus is executed. When the command for starting an engraving operation is given after adjustment of the stylus displacement is made, the program proceeds from step S3 to step S6. At step S6, the engraving operation is carried out on the surface of the gravure cylinder according to original image data. If other processes are selected, the program proceeds from step S4 to step S7, wherein the elected process(es) are executed, and then the program returns to step S2.

Following is a description of the operation adjusting stylus lateral displacement.

Figure 10:
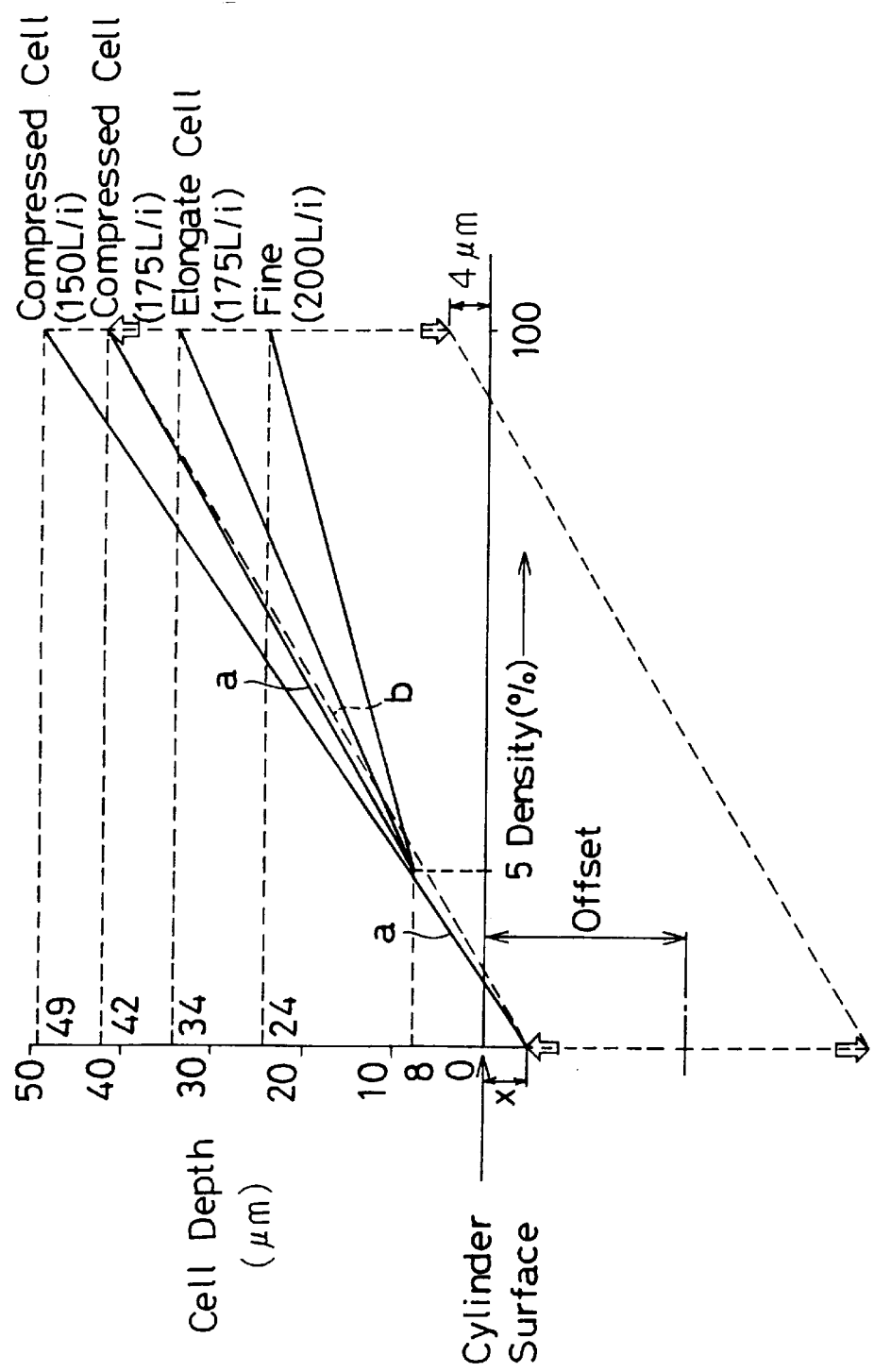
FIG. 10 graphs the dependent relation between cell depth and image density for several engraving screen rulings as a given engraving system calibration factor.

Reference is made to FIG. 10, which graphs specified factors relating inking density, (determining printed tone value at the image point printed by a cell), to cell depth (or size) for several screen rulings corresponding to different printing resolutions.

The rotogravure engraving pattern establishes a screen angle in parallel lines diagonal to the gravure cylinder axis, along which adjacent cells are aligned, and the pattern also determines the concentration per inch of the lines, corresponding to image resolution. Examples represented in the graph of FIG. 10 include compressed-cell, elongated-cell and fine engraving patterns, corresponding to successively higher lines/inch concentrations, and correspondingly shallower cell depths at maximum (100%) density. As the graph shows, the relation between the density and cell depth varies with the engraving patterns determining line concentration. The solid curves in the figure correspond to stylus displacement relative to the gravure cylinder C surface, and represent characteristics conditioned by, among other factors, mechanical limitations imposing restrictions including maximum cell depth recommended to allow sufficient inter-cell wall width, and by minimum cell size to effect ink transfer from the gravure cylinder.

Image-density/cell-depth calibration factor curve a in FIG. 10 shows that for a compressed-cell engraving pattern providing a ruling of 175 lines L/in., in order to cut cells of depth in conformity with density values to maintain consistent resolution, the stylus displacement has to be adjusted according to the curve. Specifically in this case, for 100% printing density, the cell depth is limited to 42 $\mu$m, to achieve 5% ink density from a cell, the depth must be 8 $\mu$m; for 0% density, the stylus is brought off the cylinder surface by a predetermined minimal spacing x (approximately 5 $\mu$m herein) so that the stylus will not touch the cylinder surface at all through its cycle of vibration. In this example, the stylus can be controlled optimally by engraving signal voltages generated through data corresponding to calibration factor curve a, thus without special effort by the operator.

Because curve a is nonlinear, there being a bending point at 5% density (corresponding to the minimum amount of ink a cell must carry to effect printing) beyond which the slope is dependent upon the screen ruling, however, the engraving signal control voltage data cannot be stored simply as being in direct linear dependence upon the screen ruling. Thus in the program of this embodiment of the present invention reference data corresponding to characteristic linear function b indicated by the dashed line in FIG. 10 are obtained initially, and these data are then adjusted to corrected values of b according to the relation between reference line b and calibration factor curve a in order to generate an engraving signal providing engraved cell sizes corresponding to image density at consistent resolution.

In other words, the bending point on curve a, as the calibration factor curve in this embodiment, defines it as non-linear. However, it is possible to define an equivalent linear curve not having the bending point. In that case, the slope of curve a in the 5–100% image density range would equal that of the curve in the 0–5% image range, and the stylus displacement at image density 0% would be set to −5 $\mu$m.

Figure 14:
FIGS. 14(a) to (c) illustrate engraving signal component waveforms.
Figure 14:
Figure 14:
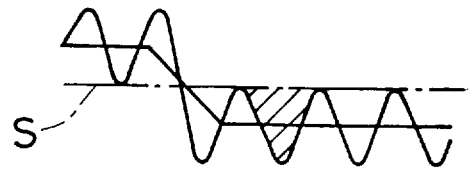

An output voltage waveform v of the digitalized engraving signal developed by the controller 40 is represented by the following equation:

$$v = (-127 \sim 127)Gc + (0 \sim 255)Gd - 16Gs \quad (1)$$

wherein the first element on the right-hand side of the equation is a parameter corresponding to generation of a carrier signal [diagramed in FIG. 14(a)]; the second element is a parameter expressing the density signal to be superimposed on the carrier signal [FIG. 14(b)]; and the third element therein is a parameter corresponding to an offset signal (FIG. 10) establishing the distance by which the center of the range of stylus travel is offset from the printing cylinder surface.

Equation (1) indicates that the amplitude of the carrier signal is varied ±127 increments; that of the density signal is varied in 256 increments (which is not always 256; in a later example, the density signal amplitude is varied in 228 increments) equivalent to tone value stages; and that of the offset signal is varied in 16 increments. The constants Gc, Gd and Gs in Equation (1) are engraving signal gains adjusted by engraving parameters including cell form, screen ruling, and gravure cylinder diameter. Furthermore, the carrier gain Gc designates amplitude of the output waveform, the density gain Gd designates the slope of the characteristic reference line b, and the offset gain Gs in designating the axis of the engraving signal waveform sets the stylus position offset from the cylinder surface.

Each of the aforementioned gains is computed through the routines diagramed in the flowcharts of FIGS. 6 to 9. First, it is determined at step S10 whether engraving parameters including cell form, screen ruling, and cylinder diameter are operator-input. Engraving parameter input accordingly sets the controller 40 at step S11. (Engraving parameters including cell size data etc. are stored in the controller 40 beforehand.) Then, a series of cells corresponding to a representative succession of density increments is engraved at step S12. Herein, if values for the gains computed in a prior engraving operation are in storage, an engraving signal generated with the previously established gains is output, and test cells are thereby cut in 10% density increments on the printing cylinder C. Wherein no previously computed values for each gain parameter exist, an engraving signal developed by gains set at predetermined values ($Gc=Gc_o$; $Gd=Gd_o$; $Gs=Gs_o$) drives the engraving of test cells at 10% density increments.

Then, at step S13, a focus control signal is applied to the camera controller 46, whereby the optical microscope 41 is focused on the gravure cylinder C surface. Furthermore, the timing pulse from the controller 40, which is generated according to the rpm of the gravure cylinder C and to the screen ruling of the engraved cells, is applied to the camera controller 46, by which the strobe is actuated at the pulse timing. Consequently, cell form at a given position on the gravure cylinder C can then be observed as a still image on the CRT monitor 48 through the optical microscope 41.

In order to focus the optical microscope 41 on the gravure cylinder C surface, a control process is carried out by the image processing apparatus 47 wherein an image density histogram of cell portrait data detected by the CCD 45 is developed and the optical microscope 41 is advanced or retreated until the histogram records maximum height, corresponding to maximum image contrast, at which point, therefore, the image is in focus.

The cell form image data thus obtained is output from the camera controller 46 and applied to the image processing apparatus 47 as the video signal. Then, at step S14, a signal is applied from the controller 40 to the image processing apparatus 47 and the image processing apparatus measures individual cell dimension (for example, maximum cell width). The measured cell dimension data is received by the controller 40 through the RS232C, and accordingly it is determined at step S15 whether the cell dimension is within tolerance. Although the cells are engraved through the full range of 10% density increments, determination whether the cell dimension is within tolerance is made using calibration data from the 20%-density and the 100%-density cells.

It is also possible that determination whether cell dimension is within tolerance can be made using cell dimension data measured for cells corresponding to other of the density increments, or to all of them.

Figure 9:
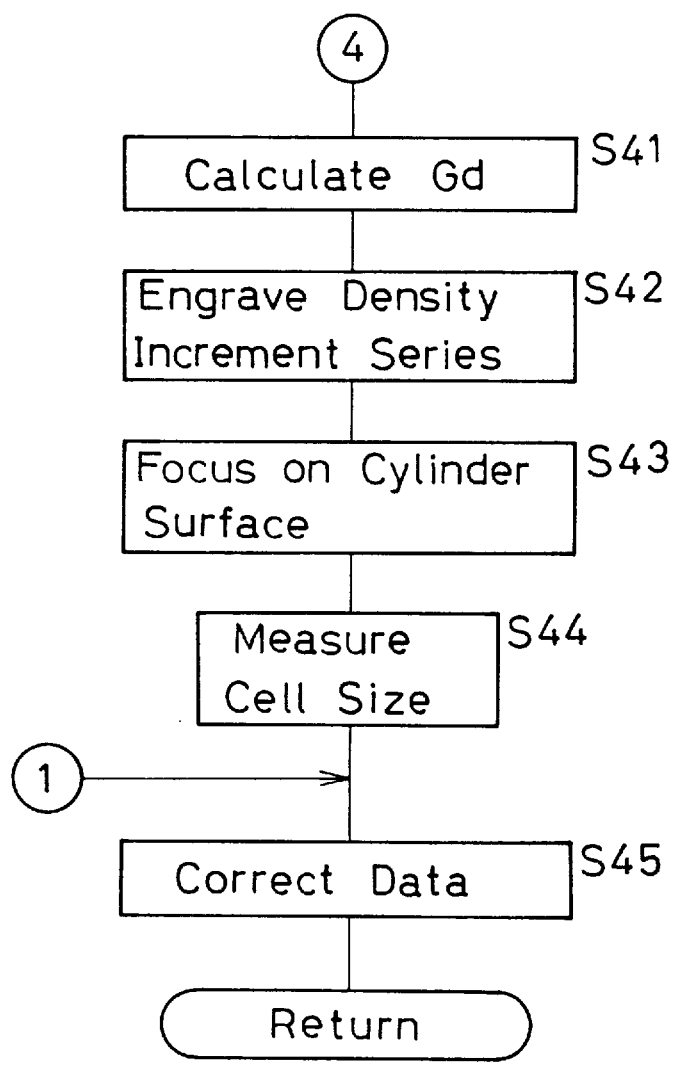

At this point, given that the cell dimension is within tolerance, the program proceeds to a data-correcting operation as outlined in FIG. 9.

In many cases, as in a specific instance of replacing the gravure cylinder C only and leaving other of the engraving operation conditions unchanged, for example, previously obtained adjustment data can be used. In such cases, YES is concluded at step S15, and the process for obtaining reference data is omitted, such that only the data correcting process is performed. Consequently, processing time can be shortened.

Figure 7:
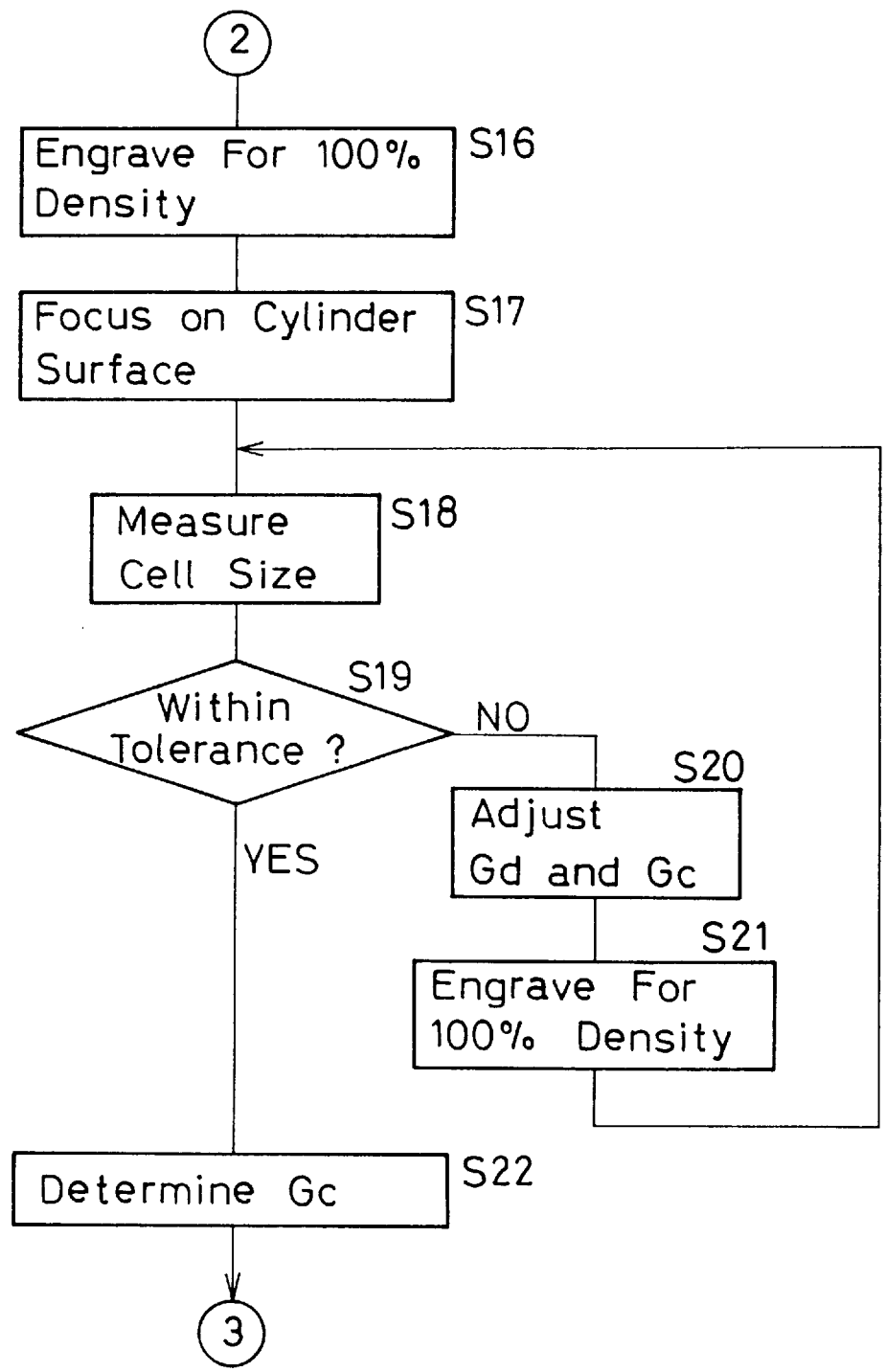

When it is determined at step S15 that the cell dimension is not within tolerance, the program proceeds to step S16 of FIG. 7. At step S16, the engraving signal is developed changing the gains Gc, Gd and Gs to initial values and the density to 100% according to Equation (1), and the engraving operation is executed. Subsequently, at step S17, the optical microscope 41 is focused on the cylinder surface as described above and the size of a cell engraved for 100% density is measured at step S18. It is determined at step S19 whether the measured cell dimension is within tolerance. If it is not, the program proceeds from step S19 to step S20. At step S20, the density gain Gd and the carrier gain Gc are adjusted according to Equations (2) and (3), described later. Then, an engraving signal for 100% density is generated according to Equation (1) using the adjusted gains, and the engraving operation is carried out at step S21. The program then returns to step S18. The processes at steps S18 to S21 are repeated until it is determined that cell size for 100% density is within tolerance, and then the program proceeds from step S19 to step S22. At step S22, the finally resulting carrier gain Gc is determined.

Figure 11A:
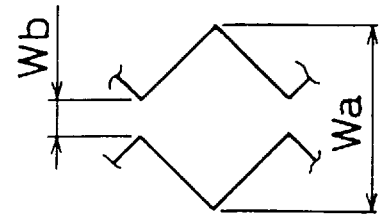
FIGS. 11(a) to (c) illustrate respective width changes in channel-type engraved cells resulting when density-gain and carrier-signal gain engraving signal parameters are changed.
Figure 11B:
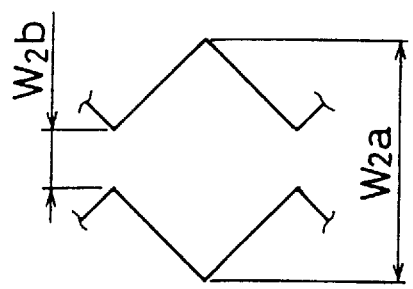
Figure 11C:
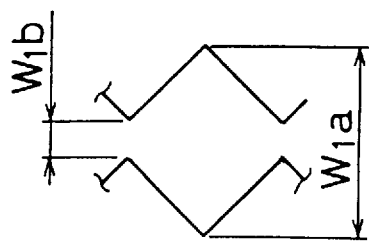
Figure 12B:
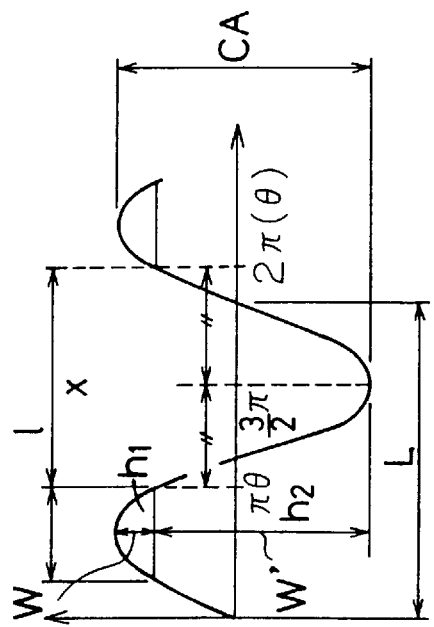
FIG. 12(b) graphs an engraving signal output waveform illustrating correspondence between portions of the waveform and formal parameters of the cell engraving pattern of FIG. 12(a)
Figure 12A:
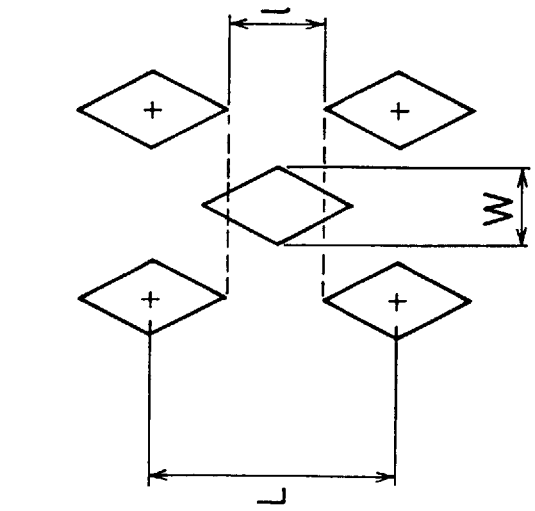
FIG. 12(a) illustrates dimensional reference points in a pattern of non-channel type engraved cells.

The operation of adjusting the density gain Gd and the carrier gain Gc at step S20 will be described hereinafter. There are two basic types of cell configuration, namely, channel-type, in which circumferentially adjacent cells in an engraving row (in the rotation direction of the gravure cylinder C) are interconnected as shown in FIGS. 11(*a*) to (*c*), and non-channel type, in which circumferentially adjacent cells are not interconnected, as shown in FIG. 12(*a*). The channel type are used, for example, in order to improve the flow of ink during a printing operation.

In the case of the channel type, assuming that the cell configuration shown in FIG. 11(*a*) is provided through a first engraving operation using density gain $Gd_1$ and carrier gain $Gc_1$, and the cell configuration shown in FIG. 11(*b*) is provided through a second engraving operation using density gain $Gd_2$ and carrier gain $Gc_1$, then the target density gain Gd, and the target carrier gain Gc, for providing a desired cell form (wherein the maximum width is Wa and the channel width is Wb) are calculated according to the following equations.

$$Gd = Gd_2 + (Gd_2 - Gd_1) \frac{(Wa + Wb) - (W_2a + W_2b)}{(W_2a + W_2b) - (W_1a + W_1b)} \quad (2)$$

$$Gc = Gc_1 \cdot \frac{(Wa - Wb)}{(W_2a - W_2b)} \quad (3)$$

Meanwhile, in the case of the non-channel type, the target density carrier gains Gd and Gc are obtained as follows. Specifically, when the cells are engraved as shown in FIG. 12(*a*), distance L between the cells along a row, and cell width W correspond to portions of the engraving signal output waveform indicated by the same references in the FIG. 12(*b*) diagram. In particular, since L corresponds to the carrier signal period ($2\pi$) in the figure, x in FIG. 12(*b*) is calculated as follows.

$$x = \frac{1}{L} \cdot 2\pi$$

$$\therefore \theta = \frac{3}{2}\pi \pm \frac{1}{2} \quad \frac{1}{L} \quad 2\pi = \left(\frac{3}{2} \pm \frac{1}{L}\right)\pi$$

In addition, $$(1 - \sin\theta): h_1 = (\sin\theta + 1): h_2;$$

$$h_2 = \frac{h_1(\sin\theta + 1)}{1 - \sin\theta}$$

Then, if W is substituted for $h_1$ and W' is substituted for $h_2$, the peak-to-peak amplitude CA of the modulated carrier is given by:

$$CA = W + W' = W + \frac{W(\sin\theta + 1)}{1 - \sin\theta} =$$

$$W\frac{1 - \sin\theta + \sin\theta + 1}{1 - \sin\theta} = \frac{2W}{1 - \sin\theta} \; ;$$

wherein $$\theta = \left(\frac{3}{2} + \frac{1}{L}\right)\pi$$

Accordingly, if the equation W'=W (sin θ+1)/(1−sin θ) is substituted for −$W_1$b and −$W_2$b in Equations (2) and (3) of Formula 1, W is substituted for $W_1$a and $W_2$a, and CA is substituted for ($W_2$a−$W_2$b), the objective density gain Gd and the objective carrier gain Gc can be obtained.

From the preceding description, it follows that the target density and carrier gains theoretically should be obtainable by engraving only two 100%-density cells via signals having different density gains. In practice, however, errors in cell size measurement and so on, make the derivation of correct gains a more involved process; therefore, optimal target gains are obtained by repetitions of the afore-described calculating processes at step S20.

In step S20, when the density gain Gd and the carrier gain Gc are obtained according to the above-given equations, cell size data obtained at step S12 and step S16 for two 100%-image density cells are used at first. After that, the cell size data used in the calculating processes are replaced with every repetition of steps S18–S21; thus data corresponding to the most recently cut pair of cells are used in succession.

Figure 8:
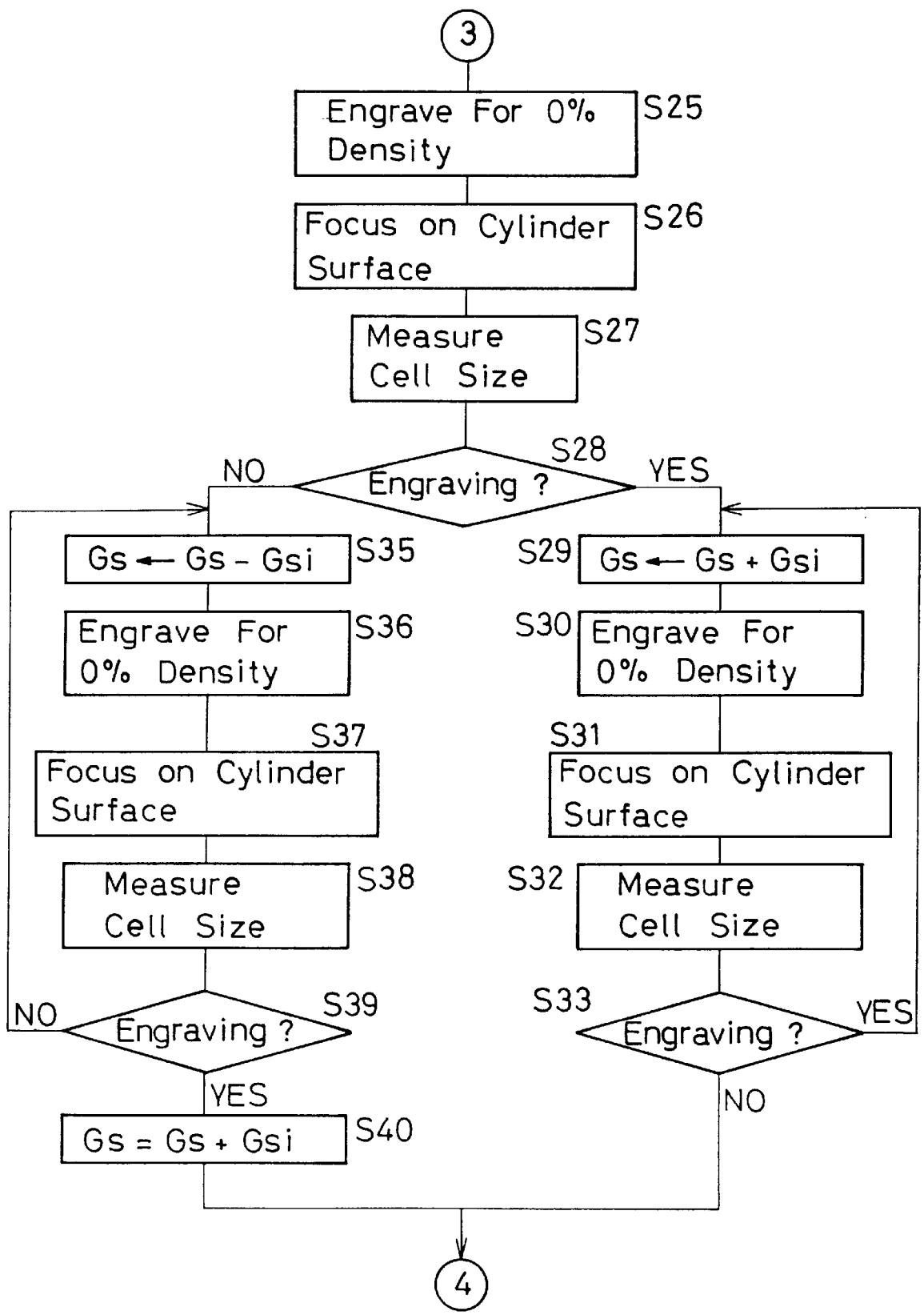

Next, an engraving signal is output so as to engrave 0%-density cells at step S25 of FIG. 8. At this time, an engraving signal for 0% density according to Equation (1) is formed using the previously set initial value $Gs_o$ as the offset gain Gs and the carrier gain Gc determined at step S22. At steps S26 and S27, the optical microscope 41 is then focused on the cylinder surface as described above to observe cell configuration corresponding to 0%-density engraving. It is subsequently confirmed at step S28 whether no cells are engraved on the cylinder surface.

If cells are engraved, the program proceeds from step S28 to step S29. At step S29, the offset gain Gs is increased to (Gs+Gsi), and then the program proceeds to step S30. At steps S30, S31 and S32, the engraving signal is output, whereby the stylus is controlled for 0%-density cells using the offset gain Gs changed at step S29 as described above, and the optical microscope 41 is focused on the cylinder surface to observe the cell form. It is determined at step S33 whether the cells are engraved or not. If cells are engraved, the program returns to step S29, at which the stylus is withdrawn from the cylinder surface by further increasing the offset, and then the same processes are repeated until cells are no longer engraved. Thereupon the program proceeds to the next step.

Meanwhile, when it is determined at step S28 that no cell has been cut, the program proceeds from step S28 to step S35. At step S35, the offset gain Gs is reduced to (Gs−Gsi), and then processes at steps S36, 37 and 38 are executed. More specifically, the engraving signal is output, whereby the stylus is controlled for 0%-density cells using the reduced offset gain Gs, and the optical microscope 41 is focused on the cylinder surface to observe the cell form. It is then determined at step S39 whether cells have been cut. In case that the stylus is not yet cutting, the program returns to step S35 to further reduce the offset gain Gs. The processes at step S36 to 39 are subsequently repeated. More specifically, the stylus is gradually approached toward the cylinder surface by reducing the offset gain Gs until cells are just cut. Thereupon, the program proceeds from step S39 to step S40. At step S40, the offset gain Gs is increased by one step (Gs+Gsi), and then program proceeds to step S41. Thus, the optimal offset gain Gs is determined.

The density gain Gd is calculated at step S41 as indicated in FIG. 9. The calculation is carried out according to the following equation:

$$Gd = Gd_o + 16(Gs - Gs_o)/228$$

where "228" is a number of 100%-density increments [which corresponds to the value "256" in Equation (1)] and "16" is equivalent to the offset-increment number in Equation (1).

According to the foregoing description, the gains Gc, Gs and Gd are thus determined, establishing Equation (1) for developing the engraving signal.

Engraving signal data is derived from Equation (1) thus obtained, and a selection of density increments, for example cells of incremental depths corresponding to a 10% density succession, is engraved at step S42. Then, at steps S43 and S44, the optical microscope 41 is focused on the cylinder surface as described above in order to observe cell form. Reference line b (dashed line in FIG. 10) data used to correct for working cell depths are derived therein. The selection of a series of density increments allows the controller in establishing liner function represented by line b of FIG. 10 to compensate for actual statistical variance.

At step S45, engraving signal-waveform gain data is corrected according to values in the reference characteristic linear relation b which correspond to data obeying the calibration factor (indicated by solid line a in FIG. 10). More specifically, as illustrated in FIG. 13, having established the linear relation b by the afore-described processes, the calibration factor a, relating image density to cell depth in actual execution, is written onto equivalent data in the linear relation of reference characteristic b.

Figure 13:
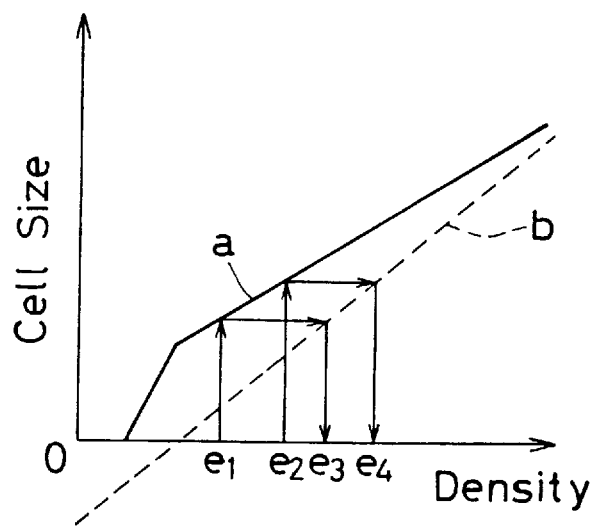
FIG. 13 is a graph illustrating engraving signal data correction based upon the calibration factor relating cell depth to image density.

Given that the reference characteristic b is designated by a certain linear function and that the calibration factor a is designated by a certain nonlinear function, for example, then as shown in FIG. 13 cell size data providing image densities $e_1$ and $e_2$ are corrected to equivalent data $e_3$ and $e_4$ obeying linear relation b according to the relation between the two functions a,b. If a cell of size corresponding to $e_1$ image density is to be formed, the value em is corrected to the equivalent density value $e_3$ in the reference characteristic b data, and the engraving signal is accordingly developed. The image density corresponding to the engraved cell is consequently $e_1$.

Thus the engraving signal gains are set corresponding to the printed image density/cell depth calibration factor a by parametric values corrected to equivalent values obeying the linear relation in b, expediting the operational computing of the data v modulating the engraving signal output waveform according to Equation (1).

The linear function b defining the reference characteristic can also be derived from the cell size data obtained from the engraved density increment series, using the curve approximation method or a polygonal line function.

Moreover, in a case in which the relation between cell depth and image density is not significantly influenced by a change in engraving parameter, processes for determining each of the engraving signal waveform gains is omitted, and the process at step S45 is executed. Therein, data correction is carried out using the reference characteristic b derived from cell size data of the density increment series set at step S11.

According to the embodiment of the present invention detailed in the foregoing description, stable automatic adjustment of the engraving stylus lateral displacement is realized simply by setting the engraving operation parameters at the controller 40, thereby saving operator labor and processing time. Consequently, stable adjustment of the electromechanical engraving of inking cells into the gravure printing cylinder is guaranteed, assuring consistency among printing operations.

Furthermore, with apparatus embodied according to the present invention, since cell form is measurable during rotation of the cylinder in real time, consistency of engraved cell size during the course of an engraving operation can be confirmed, for example, or cell deformation due to a broken stylus or the like can be discovered, such that operational abnormalities are detectable in the early stages.

Modifications

Although the engraving operation and the cell measuring operation are repeated in that order, for example at steps S18 to S21 according to the foregoing embodiment of the present invention, the engraving operation may be performed meanwhile the engraving signal waveform gains are adjusted, whereupon engraved cell form is measured. In this case, processing time is further shortened.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A rotogravure automatic calibrating apparatus for automatically adjusting electromechanical engraving of cells into a printing cylinder by a stylus of a rotogravure engraving system, wherein the stylus is actuated to engrave cells in response to an engraving signal generated by the engraving system according to a plurality of control parameters determining displacement relative to said printing cylinder of said stylus, said apparatus comprising:

cell measuring means obtaining cell size data expressing size of an individual cell engraved into said printing cylinder; and engraving signal calibrating means adjusting said control parameters of said engraving signal based upon said cell size data obtained by said cell measuring means;

said engraving signal being calibrated to actuate said stylus to engrave cells according to an image-density/cell-depth calibration factor for a screen ruling for the engraving system.

2. A rotogravure automatic calibrating apparatus according to claim 1, wherein said engraving signal calibrating means comprises:

calibration factor computing means computing an image-density/cell-depth reference characteristic and computing said image-density/cell-depth calibration factor as a correction from said image-density/cell-depth reference characteristic, for obtaining said image-density/cell-depth calibration factor for the designated screen ruling according to cell size data obtained by said cell measuring means for cells engraved to correspond to a representative series of singular-resolution test image densities; and engraving signal gain data-processing means generating engraving signal data based upon said image-density/cell-depth calibration factor for adjusting said engraving signal to actuate said stylus to engrave cells of size corresponding to the designated screen ruling.

3. A rotogravure automatic calibrating apparatus according to claim 2, wherein said stylus vibrating with controlled lateral displacement superficially engraves said cells into said printing cylinder.

4. A rotogravure automatic calibrating apparatus according to claim 3, wherein said engraving signal is generated in the rotogravure engraving system by superimposing a carrier signal with an image density signal.

5. A rotogravure automatic calibrating apparatus according to claim 4, wherein amplitude of said carrier signal is in correspondence with an engraving signal control carrier-gain parameter adjustable according to engraving requirements; and a characteristic of said image density signal is in correspondence with an engraving signal control density-gain parameter adjustable according to the engraving requirements.

6. A rotogravure automatic calibrating apparatus according to claim 5, wherein said engraving signal is further modulated according to an engraving signal control offset-gain parameter controlling said stylus not to contact said printing cylinder superficially at 0% image density according to said image-density/cell-depth calibration factor.

7. A rotogravure automatic calibrating apparatus according to claim 6, wherein said engraving signal is digitized in the engraving system to have an incrementally variable output voltage waveform v represented by the equation:

$$v = (-A \sim A)Gc + (B)Gd - (C)Gs;$$

wherein

A is an integral number of increments by which carrier signal amplitude is variable;

B is a positive integral number of increments by which said image density signal is variable;

C is a positive integral number of increments by which the offset-gain parameter is variable;

Gc is the carrier gain parameter;

Gd is the density gain parameter; and

Gs is the offset-gain parameter.

8. A rotogravure automatic calibrating apparatus according to claim 7, wherein said calibration factor computing means comprises:

engraving signal-gain computing means computing said carrier gain parameter according to cell size data for cells corresponding to maximal image density, said offset gain parameter according to cell size data for stylus control corresponding to 0% image density, and said density gain using the computed offset gain parameter.

9. A rotogravure automatic calibrating apparatus according to claim 8, wherein (a) for cells circumferentially adjacent in engraving rows interconnected by a channel, said gain computing means computes said carrier gain according to the equation:

$$Gc = Gc_1 \times \frac{(Wa_0 - Wb_0)}{(Wa_1 - Wb_1)} \; ; \text{wherein}$$

Gc is a target value of the carrier gain parameter;

$Gc_1$ is a given value of the carrier gain parameter;

$Wa_o$ is maximum width of target cell size;

$Wb_o$ is channel width of target cell size;

$Wa_1$ is maximum width of cell engraved by a signal having carrier gain $Gc_1$; and $Wb_1$ is channel width between cells engraved by a signal having carrier gain corresponding to $Gc_1$; and (b) for cells circumferentially adjacent in engraving rows and discretely engraved, said gain computing means computes said carrier gain according to the equation:

$$Gc=Gc_1 \times (Wa_o-Wb_o)/CA;$$

wherein $$CA=2W/(1-\sin\theta)$$

$$\theta = \left(\frac{3}{2} \pm \frac{1}{L}\right)\pi$$

W is maximum width of a cell engraved by an engraving signal having carrier gain corresponding to $Gc_1$; and L is distance between adjacent cell centers in the engraving rows.

10. A rotogravure automatic calibrating apparatus according to claim 9, wherein said engraving signal-gain computing means computes said offset gain parameter by detecting whether a cell is superficially engraved in said printing cylinder with an engraving signal for 0% image density.

11. A rotogravure-automatic calibrating apparatus according to claim 10, wherein said engraving signal-gain computing means computes said density gain parameter using said computed offset gain parameter and the following equation:

$$Gd=Gd_o+C\ (Gs-G_o)/B;$$

wherein

Gd is a target value of the density gain parameter; and $Gd_o$ is an initial value of the density gain parameter.

12. A rotogravure automatic calibrating apparatus according to claim 11 wherein said calibration factor computing means computes said image-density/cell-depth calibration factor for the designated screen ruling by estimating cell size data for a predetermined percent-image density succession of cells which are engraved by engraving signals according to said computed carrier gain, offset gain and density gain parameters.

13. A rotogravure automatic calibrating apparatus according to claim 7, further comprising:

detecting means for detecting whether size data of select cells for predetermined percent-image density succession of cells engraved by engraving signals according to currently-computed carrier gain, offset gain and density gain parameters designating new engraving requirements are within tolerance; wherein if said size data indicates said select cells are within tolerance, said calibration factor computing means obtains said image-density/cell-depth calibration factor for the designated screen ruling according to cell size data for a predetermined percent-image density succession of cells which are engraved by engraving signals according to said currently-computed carrier gain, offset gain and density gain parameters.

14. A rotogravure automatic calibrating apparatus according to claim 7, wherein said cell measuring means comprises:

cell observation means obtaining cell image data expressing a formal image of an individual cell engraved into said printing cylinder; and cell size calculating means calculating said cell size data based upon said cell image data.

15. A rotogravure automatic calibrating apparatus according to claim 14, wherein said cell observation means comprises:

an optical microscope approachable toward and withdrawable away from said printing cylinder; and a camera device for registering a formal cell image obtained through said optical microscope.

16. A rotogravure automatic calibrating apparatus according to claim 15, wherein said cell observation means obtains said cell image data while said printing cylinder rotates.

17. A rotogravure automatic calibrating apparatus according to claim 16, wherein said cell observation means further comprises a stroboscopic light source generating stroboscopic flashes at a predetermined frequency for still-image observation of individual cell form as said printing cylinder rotates.

18. A rotogravure automatic calibrating apparatus according to claim 15, wherein said cell observation means further comprises:

an automatic focus control means focusing said optical microscope onto said printing cylinder superficially, wherein focus of said optical microscope is automatically adjusted to achieve maximum image contrast in said still-image observation of the individual cell.

19. A rotogravure stylus drive apparatus for driving a rotogravure stylus of an electromechanical engraving system to engrave cells into a printing cylinder, said apparatus comprising:

means driving said stylus;

engraving signal generating means generating an engraving signal supplied to the driving means for controlling an engraving system engraving operation of said rotogravure stylus; and an adjusting means adjusting displacement of said stylus;

said adjusting means comprising:

cell measuring means obtaining cell size data expressing size of an individual cell engraved into said printing cylinder; and engraving signal calibrating means adjusting control parameters of said engraving signal based upon said cell size data obtained by said cell measuring means; wherein said engraving signal is calibrated to actuate said stylus to engrave cells according to an image-density/cell-depth calibration factor for a screen ruling for said engraving system engraving operation.

20. A rotogravure stylus drive apparatus according to claim 19, wherein said engraving signal calibrating means comprises:

calibration factor computing means computing an image-density/cell-depth reference characteristic and computing said image-density/cell-depth calibration factor as a correction from said image-density/cell-depth reference characteristic, for obtaining said image-density/cell-depth calibration factor for the designated screen ruling according to cell size data obtained by said cell measuring means for cells engraved to correspond to a representative series of singular-resolution test image densities; and engraving signal gain data-processing means generating engraving signal data based upon said image-density/cell-depth calibration factor for adjusting said engraving signal to actuate said stylus to engrave cells of size corresponding to the designated screen ruling.

21. A rotogravure stylus drive apparatus according to claim 20, wherein said engraving signal is generated in the rotogravure engraving system by superimposing a carrier signal with an image density signal.

22. A rotogravure stylus drive apparatus according to claim 21, wherein amplitude of said carrier signal is in correspondence with an engraving signal control carrier-gain parameter adjustable according to engraving requirements; and a characteristic of said image density signal is in correspondence with an engraving signal control density-gain parameter adjustable according to the engraving requirements.

23. A rotogravure stylus drive apparatus according to claim 22, wherein said engraving signal is further modulated according to an engraving signal control offset-gain parameter controlling said stylus not to contact said printing cylinder superficially at 0% image density according to said image-density/cell-depth calibration factor.

24. A rotogravure stylus drive apparatus according to claim 23, wherein said engraving signal is digitized in the engraving system to have an incrementally variable output voltage waveform v represented by the equation:

$$v = (-A \sim A)Gc + (B)Gd - (C)Gs;$$

wherein

A is an integral number of increments by which carrier signal amplitude is variable;

B is a positive integral number of increments by which said image density signal is variable;

C is a positive integral number of increments by which the offset-gain parameter is variable;

Gc is the carrier gain parameter;

Gd is the density gain parameter; and

Gs is the offset-gain parameter.

25. A rotogravure stylus drive apparatus according to claim 24, wherein said calibration factor computing means comprises:

engraving signal-gain computing means computing said carrier gain parameter according to cell size data for cells corresponding to maximal image density said offset gain parameter according to cell size data for stylus control corresponding to 0% image density, and said density gain using the computed offset gain parameter.

26. A rotogravure stylus drive apparatus according to claim 25, wherein (a) for cells circumferentially adjacent in engraving rows interconnected by a channel, said gain computing means computes said carrier gain according to the equation:

$$Gc = Gc_1 \times \frac{(Wa_0 - Wb_0)}{(Wa_1 - Wb_1)} ; \text{wherein}$$

Gc is a target value of the carrier gain parameter;

$Gc_1$ is a given value of the carrier gain parameter;

$Wa_o$ is maximum width of target cell size;

$Wb_o$ is channel width of target cell size;

$Wa_1$ is maximum width of cell engraved by a signal having carrier gain $Gc_1$; and $Wb_1$ is channel width between cells engraved by a signal having carrier gain corresponding to $Gc_1$; and (b) for cells circumferentially adjacent in engraving rows and discretely engraved, said gain computing means computes said carrier gain according to the equation:

$$Gc = Gc_1 \times (Wa_o - Wb_o)/CA;$$

wherein $$CA = 2W/(1 - \sin \theta)$$

$$\theta = \left( \frac{3}{2} \pm \frac{1}{L} \right) \pi$$

W is maximum width of a cell engraved by an engraving signal having carrier gain corresponding to $Gc_1$; and L is distance between adjacent cell centers in the engraving rows.

27. A rotogravure stylus drive apparatus according to claim 26, wherein said engraving signal-gain computing means computes said offset gain parameter by detecting whether a cell is superficially engraved in said printing cylinder with an engraving signal for 0% image density.

* * * * *